Jan. 9, 1940.   D. R. SHOULTS   2,186,843
CONTROL SYSTEM
Filed April 28, 1938
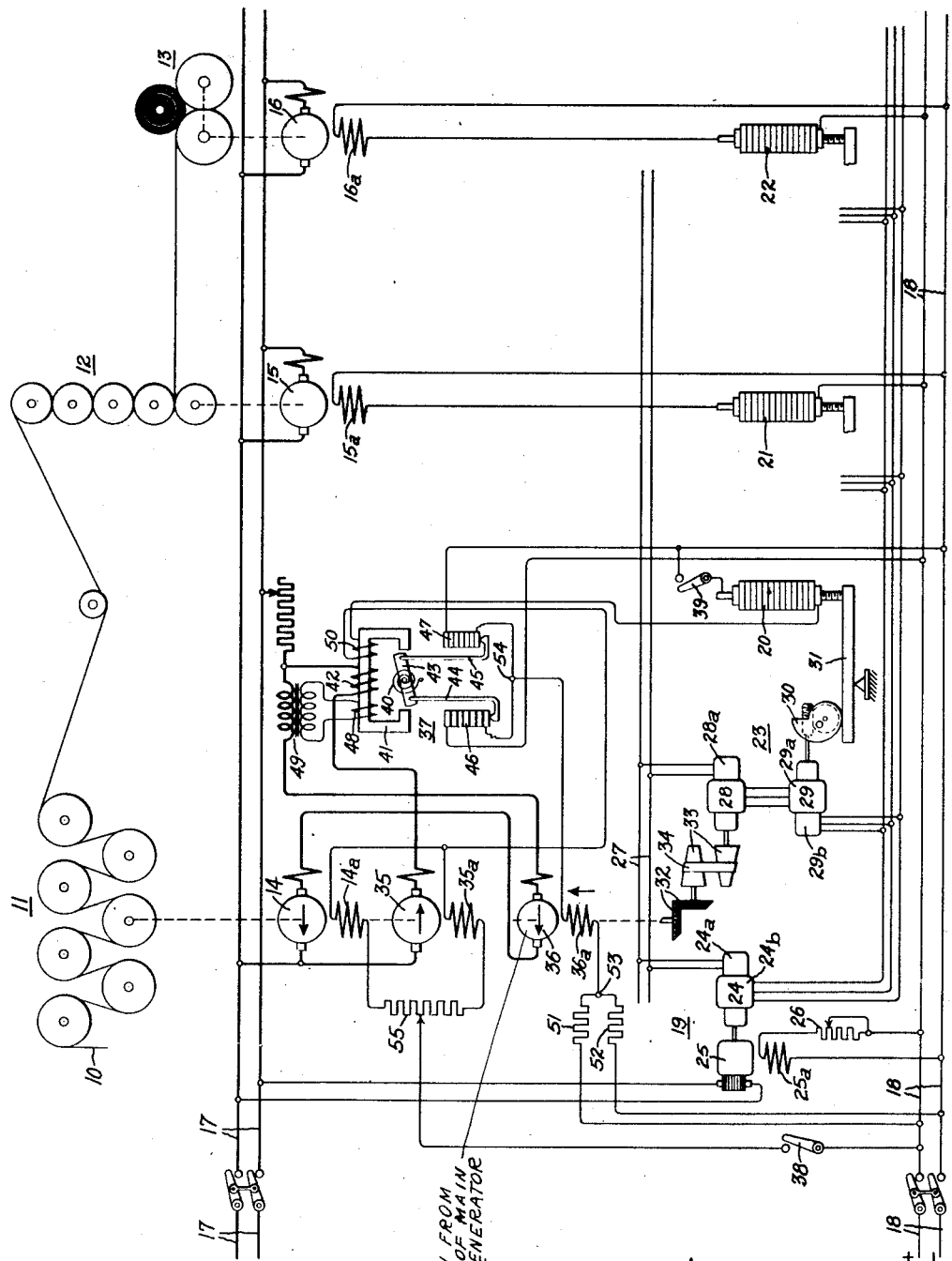
Inventor:
David R. Shoults,
by Harry E. Dunham
His Attorney.

Patented Jan. 9, 1940

2,186,843

UNITED STATES PATENT OFFICE

2,186,843

CONTROL SYSTEM

David R. Shoults, Schenectady, N. Y., assignor to General Electric Company, a corporation of New York Application April 28, 1938, Serial No. 204,794

8 Claims. (Cl. 172—293)

This invention relates to control systems, more particularly to systems for controlling the operation of dynamo-electric machines, and it has for an object the provision of a simple, reliable and improved system of this character.

More specifically, the invention relates to systems for controlling the speed of dynamo-electric machines which operate as motors to drive a load and which at times may be "overhauled" by the load and driven as generators, and a more specific object of the invention is the provision of means for maintaining the speed of such a machine substantially constant, i. e., for minimizing changes in the speed resulting from changes in load.

An important aspect of the invention is a control system for sectionalized apparatus which performs operations on a length of material in which each section of the apparatus is driven by its own individual electric motor. For example, in one type of drive for modern paper making machines, the sizing roll section, drier section, calender section, and winding section, and other sections are driven by individual direct current electric motors. Between the calender section and the drier section a substantial tension exists in the web which relieves the load on the drier motor in proportion to the magnitude of the tension. When the machine is producing a light stock, such as tissue paper or the lighter grades of kraft paper, this tension will be sufficient only partially to unload the drier motor. However, when heavier stocks are being produced such as the heavier grades of kraft paper or any of the board stocks, the tension required by paper making conditions may be sufficient to unload the drier motor entirely and even to require the drier motor to operate as a braking generator up to full load to maintain the speed of the drier section at the required value.

A sudden "snap-off" or breakage in the web is always likely to occur. This breakage may be caused by wet spots in the paper, rough or torn edges, or a number of other causes. Whenever such a "snap-off" occurs in the web between the calender and drier sections, the load carried by the tension in the web prior to the break is suddenly transferred to the drier motor. As a result of this sudden imposition of load, the speed of the drier motor decreases.

The sectional drive motors of modern papermaking machines are provided with speed regulating equipment for maintaining the required relative speed or "draw" between the sections. This regulating equipment is usually of the integrating type which is very accurate but which if designed for stable operation, does not have a rapid speed of response.

The drier section adjoining the calender section occupies a unique position with respect to rapid load changes. The remaining sections have no sudden load changes and consequently the conventional, highly accurate speed regulating equipment performs satisfactorily on the drive motor for these sections. However, when a heavy load is suddenly thrown on the drier motor, the conventional speed regulating equipment is not fast enough to prevent the speed of the drier motor decreasing momentarily. As a result of this, a loop is formed and tension is lost in the web between the drier section and the next preceding section of the machine. A loop at this point causes wrinkles to be formed in the web and when the wrinkled web subsequently passes through the drier and calender sections, the wrinkles are pressed into creases. The resulting sheet is very weak and ragged and subject to further breakage. Such a product is commercially unacceptable and the spoilage costs are therefore correspondingly increased.

Accordingly, a further object of the invention is the provision of means for minimizing changes in the speed of a sectionalized machine section in response to sudden changes in the load on that section.

Another more specific but important object of the invention is the provision of means for minimizing the changes in speed of the drier section of a sectionalized paper making machine as a result of such changes in load occasioned by strip breakage between the calender and drier sections or other causes, thereby to prevent loss of tension in the web and the resultant spoilage and loss.

In carrying the invention into effect in one form thereof, an auxiliary dynamo-electric machine is connected in series relationship with a main dynamo-electric machine whose speed is to be controlled, and a control dynamo-electric machine is mechanically coupled to the main machine so that a terminal characteristic of the control machine, such as current or voltage, varies with variations in the speed of the main machine. Means responsive to variations in such terminal characteristic of the control machine are provided for controlling the auxiliary machine rapidly to decrease a departure of the speed of the main machine from a predetermined value. In addition, a master speed device is provided together with means responsive to variation in the ratio of the speeds of the control machine and master device for recalibrating the foregoing speed regulating means so as to restore this speed ratio to its original value and thereby to restore the speed of the main machine to the predetermined value that it is desired to maintain.

The invention is an improvement on an invention of Harold W. Rogers in Control systems disclosed in application Serial No. 191,508, filed February 19, 1938, and assigned to the assignee of the present invention.

In illustrating the invention in one form thereof, it is shown as embodied in a system for controlling the operation of a sectionalized drive for a paper making machine. It will be understood, however, that the invention has other applications.

For a better and more complete understanding of the invention, reference should now be had to the following specification and to the accompanying drawing, the single figure of which is a simple, diagrammatical illustration of an embodiment of the invention.

Referring now to the drawing, a web of paper 10 is illustrated passing through a nest of drier rolls constituting a drier section 11, then through a stack of calender rolls 12 to a winder 13 which winds the finished paper into a roll. As illustrated, the drier, calender and winding sections of the machine are driven by individual electric motors 14, 15 and 16, respectively. These driving motors are illustrated as direct current type motors and are supplied from a suitable source of D. C. voltage represented by the two supply lines 17. As indicated, motors 14, 15 and 16 are provided with direct current field windings 14a, 15a and 16a which are illustrated as supplied from a suitable source of separate excitation represented by the two excitation buses 18.

On account of changes in the stretch or "draw" in the web between sections required by various paper making conditions, the sectional driving motors 14, 15 and 16 are required to operate at different relative speeds at various times. In order to maintain the stretch or draw at a constant value for any one paper making condition it is necessary that the relationship or ratio between the speeds of each motor and the speed of the motor driving the adjoining section be maintained substantially constant. This is accomplished by providing means for maintaining a predetermined ratio between the speed of each sectional driving motor and a master speed, i. e., the speed of a master speed controlling device.

In the drawing, this speed regulating system is illustrated as comprising a master speed controlling device 19 together with a plurality of variable speed regulating resistors 20, 21 and 22, one for each sectional drive motor, and differential means responsive to the changes in the ratio between the speed of each sectional drive motor and the speed of the master speed controlling device for actuating the variable resistor for that sectional motor in such a manner as to restore the speed of that motor to the correct value.

The master speed controlling device is illustrated as an electrical motion transmitting device 24 driven at a speed which is preferably substantially constant by a suitable driving means illustrated as a direct current electric motor 25 supplied from source 17 and having a field winding 25a supplied from the excitation buses 18. A variable speed controlling resistor 26 is included in the field circuit of the motor 25 for the purpose of initially adjusting the speed to any desired value. Adjustment of the speed of the motor 25 to any value adjusts the speed of the machine as a whole because the speed regulating equipment causes each section of the machine to be driven at a speed having a fixed but adjustable ratio with the speed of the master device.

The electrical motion transmitting device 24 has a rotor member 24a and a stator member 24b. The rotor member is provided with a single phase winding (not shown) that is supplied from a suitable source of single phase voltage represented by the two supply lines 27. The stator member 24b is physically similar to the stator member of an alternating current induction motor, i. e., it is provided with a three-element winding that is physically similar to the three-phase winding of an induction motor.

The differential responsive means for actuating the variable speed controlling resistors 20, 21 and 22 associated with the sectional drive motors 14, 15 and 16, respectively are all identical and, consequently, for the purpose of avoiding repetition and for the purpose of simplifying the drawing only the differential responsive means 23 for actuating the variable resistor 20, is illustrated and described.

This differential means 23 comprises an electrical motion transmitting device 28 that is in all respects identical with the master motion transmitting device 24 and a differential electrical motion receiving device 29, together with a worm driven cam 30 and a lever 31 actuated by the cam. The rotor member 28a of the transmitting device 28 is connected to the shaft of the drier motor 14 through suitable gearings 32 and a pair of tapered pulleys 33 which are connected by means of a belt 34. The electrical differential receiving device 29 is physically similar to a wound rotor induction motor, that is to say, it has a stator member 29a that is provided with a three-element winding that is physically similar to the three-phase stator winding of a wound rotor induction motor and it has a rotor member 29b that is provided with a three-element winding (not shown) that is physically similar to the three-phase rotor winding of a wound rotor induction motor. The terminals of the stator winding of the differential receiving device 29a are connected to corresponding terminals of the stator winding of transmitting device 28 and the terminals of the rotor winding are connected to corresponding terminals of the stator winding of the master transmitting device 24. As shown, the rotor winding of the transmitting device 28 is connected to the same single phase source of supply 27 as that to which the rotor winding of the master transmitting device is connected. This part of the system operates in the following manner: The belt 34 is shifted by means of a belt shifter (not shown) to a position on the tapered pulleys 33 such that when the speed of the drier motor 14 is at the desired value the rotor member 28a of the transmitter 28 will rotate at the same speed and in step with the rotor member 24a of the master transmitter 24. When this condition obtains the rotor member 29b of the differential electrical receiving device 29 is at stand-still and the pressure on the pressure responsive resistor 20 is just sufficient to produce the required excitation for the motor 14. If the speed of the motor 14 increases or decreases with respect to the desired value, the speed of the rotor member 28a of the transmitter 28 will correspondingly increase or decrease with respect to the speed of the rotor member 24ₐ of the master transmitter 24. As a result, the rotor member 29ᵦ of the differential will rotate at a speed equal to the difference in the speeds of the transmitters 24 and 28, and in a direction dependent upon whether the speed of the rotor of transmitter 28 is greater or less than the speed of the rotor of master transmitter 24. If the speed of the motor 14 increases above the desired value, the rotor of differential receiver 29 will rotate the cam 30 in a counter-clockwise direction to compress the pressure responsive resistor 20 thereby to strengthen the field of the motor 14 and to decrease its speed and conversely, if the speed of the motor 14 decreases below the desired value the rotor of receiver 29 will rotate in a clockwise direction to relieve the pressure on the resistor 20, thereby to weaken the field of the motor 14 and to increase its speed.

Speed regulating equipment as thus far described performs very satisfactorily if no sudden large changes in the load are involved and it is so accurate that under these conditions it will hold an exact ratio between the speed of the master transmitter 24 and the speed of the regulated motor. If a very heavy stock such as bristol board is being produced, the tension in the web 10 between the calender stack 12 and the drier section 11 will be sufficient to unload the drier motor 14 and to drive it as a generator. If under this condition, a "snap-off" were to occur in the web between the drier 11 and the calender stack 12, several revolutions of the rotor of the differential receiver 29 might be required to weaken the field of the machine 14 sufficiently to change its operation from generating to motoring and during this time a loop would be formed in the web between the drier section and the next preceding section of the machine. The formation of such a loop in the web is very annoying and undesirable for the reasons set forth in the foregoing.

In order to minimize and practically to eliminate the formation of such a loop, additional means are provided. These additional means comprise a control dynamo electric machine 35 mechanically connected to the shaft of machine 14, an auxiliary dynamo-electric machine 36 connected in series relationship with machine 14 and preferably driven from the shaft of the main motor generator set (not shown) together with regulating means 37 responsive to the load on the control machine 35 for controlling the auxiliary machine 36. Control machine 35 normally functions as a motor and is preferably supplied from the same source 17 as that from which the main machine 14 is supplied as indicated. However, if desired the control machine 35 and the regulating equipment 37 can be arranged so that machine 35 operates as a generator. Control motor 35 is provided with a field winding 35ₐ which is connected in parallel with field winding 14ₐ and is supplied from a suitable source of excitation such as the excitation buses 18 to which it may be connected by means of switching devices 38 and 39.

Auxiliary dynamo-electric machine 36 normally operates as a booster generator with its voltage adding to the voltage of the main dynamo-electric machine 14 when the latter is overhauled by the tension in the web and driven as a generator. Machine 36 is provided with a field winding 36ₐ.

Load current circulates in the armature circuit of control machine 35 as a result of the difference of counter voltage and applied voltage. This difference produces a current that is limited by the resistance of the armature circuit. Since this difference voltage is the difference between two voltages of considerable magnitude, a small percentage change in counter voltage, resulting from a correspondingly small speed change will produce a large percentage change in difference voltage and consequently a correspondingly large percentage change in armature current. Thus the magnitude of armature current is a very sensitive indication of relative speed of the control motor.

Regulating means 37 comprises a current sensitive element of the torque-motor type which is balanced against a spiral spring 40. The torque motor directly operates a wide range, quick acting rheostat. The stator of the torque motor comprises a U-shaped magnetic core 41 upon which is mounted a D. C. coil 42. The rotor member is a bar type armature of magnetic material mounted on a shaft between the poles of the stator core in such a way that the armature tends to align itself with the stator pole pieces when the coil 42 is energized. The spiral spring 40 mounted on the torque motor shaft tends to rotate the armature in a counter-clockwise direction.

The torque motor armature 43 is connected through members 44 and 45 to operate the rheostatic element as the armature rotates.

The torque motor armature has sufficient torque to counter-balance that exerted by the spiral spring and rheostatic element, and it is designed to hold a current in the coil 42 that varies slightly with the position of the rheostatic element. In other words, the regulating device 37 is designed to have a slightly drooping characteristic.

The rheostatic element is composed of a pair of stacks 46 and 47 of special non-metallic, resistance material. When the coil 42 is deenergized and the rotor 43 is held in the position illustrated by the spiral spring 40, maximum pressure is applied to the stack 47 and minimum pressure to stack 46, so that the resistance of stack 46 is maximum and the resistance of stack 47 is minimum. When the coil 42 is energized sufficiently to overbalance the torque of the spring 40, the armature 43 is rotated in a clockwise direction against the tension of spiral spring 40 sufficiently to relieve the pressure on stack 47 thereby to increase its resistance to a maximum, and to increase the pressure on stack 46 thereby to reduce its resistance to a minimum.

As illustrated, the core member 41 is provided with a stabilizing winding 48 which is connected through a transformer 49 to the armature circuit of main dynamo-electric machine 14 and auxiliary dynamo-electric machine 36. This stabilizing winding obviates the need for dash pots or other anti-hunting devices, which easily lose their adjustment and require much maintenance.

The current responsive winding 42 of the regulator is connected in series relationship with the armature of the control motor 35, and the stacks 46 and 47 are connected in series relationship with each other across the excitation source 18. Under normal conditions of current in the armature of the control motor 35, and therefore in the energizing winding 42 of the regulator all the forces of the regulator are balanced and the rotor is stationary at some mid-position.

If desired, the magnetic and mechanical structure of regulator 37 may be designed with a flat characteristic provided that a boosting coil 50 controlled by the master speed regulating resistor 20 is added to produce the droop that is necessary for stable operation.

A pair of resistors 51, 52 are connected across the source 18, and these two resistors together with stack resistors 46 and 47 form a bridge. The field winding 36a of the auxiliary machine is connected across the opposite bridge points 53 and 54.

The field windings 14a and 35a of the drier motor and control machine respectively are connected in parallel through an adjustable resistor 55 which is provided for initially adjusting the relative strengths of the fields to the desired value. The speed regulating resistor 20 is connected in circuit with both field windings so as to change the loading of both the drier motor and control machine at the same time and in the same degree.

In explaining the operation of the control system it will be assumed that a very heavy board stock is being produced by the paper making machine and that the tension in the web between the drier 11 and the calender stack is sufficient to unload the drier motor 14 and to cause it to operate as a braking generator with a substantial load in order to keep the speed of the section at the required value. Initially the regulator 37 is so adjusted that when the drier section 11 is being operated at the desired speed under the above conditions the difference between the counter voltage of the control motor 35 and the voltage of the supply source 17 will just allow balance current to flow in the current winding 42 of the regulator. By balance current is meant the current at which the force of the spiral spring 40 and the force exerted by the stacks 46 and 47 is balanced by the force produced by the current flowing in the winding 42.

It is also assumed that with balance current flowing in coil 42, the stacks are substantially in the positions shown so that the voltage of the bridge point 53 is higher than the voltage of point 54. As a result, current flows through field winding 36a in the direction indicated by the arrow, and the armature voltage of the auxiliary machine adds to the armature voltage of machine 14. The sum of these two voltages is sufficient to cause the necessary amount of current to be supplied from machine 14 to the source to maintain the drier section at the required speed as long as the load does not change. As long as the drier section continues to operate at this desired speed, the rotor element 43 of the regulator 37 and the rotor element 29b of the master speed regulating equipment will be at rest. If a snapoff occurs in the web 10 between the drier 11 and the calender stack 12, the entire friction load of the drier section must be assumed by the machine 14 which up until now, it has been assumed, has been acting as a generator. The speeds of the drier motor 14 and the control motor 35 decrease but as the speed of the control motor 35 decreases, its armature current increases and the force produced by the current coil 42 of the regulator correspondingly increases. This force overcomes the tension of the spring 41 and causes the rotor 43 to rotate in a clockwise direction thereby to release the pressure on the stack 47 and to increase the pressure on stack 46. This weakens the field of the booster or, if the changes required are very considerable, the rotation of the rotor will continue past the point at which the voltages of points 53 and 54 become equal so that the current in the field winding 36a actually reverses. As a result, the voltage of booster machine 36 rapidly decreases or actually reverses, depending upon the magnitude of the speed change, and the machine 14 immediately draws a heavy current from the line 17 and immediately begins to operate as a motor and assumes the friction load of the drier section 11. The regulator 37 and the booster machine 36 controlled thereby function so rapidly to change the operation of the machine 14 from generating to motoring and to restore the speed of the section to the desired value that no significant loop is formed in the web 10 between the drier section 11 and the next preceding section of the machine. When the speed of the section is restored to nearly the normal value (the regulator is accurate within one-fourth of one per cent), the regulator 37 is restored to a balanced condition.

While the armature current of the motor 14 is changing, a voltage appears temporarily across the secondary winding of the transformer 49. This secondary voltage is in such a direction that the magnetomotive force of the stabilizing coil 48 opposes the magnetomotive force of the winding 42. This action tends to halt the original movement of the rheostatic element, and thus prevent overshooting. During the time the regulator 37 has been functioning to restore the speed of the section, the master speed regulating equipment has also been functioning but its action is so slow in comparison with the action of the regulator 37 that the speed is restored practically to normal by action of the regulator 37 and booster generator 36.

On account of its drooping characteristic, the speed regulating means comprising control machine 35 and regulator 37 will not completely restore the current in coil 42 and the speed of motor 14 to their original values, and consequently a loop would ultimately be formed in the web unless means were provided for recalibrating this speed regulating means or in some manner compensating the error.

The master speed regulating equipment operates as a follow-up to effect the necessary recalibration of the regulating means to restore the speed accurately to its normal value. As the speed of the machine 14 decreases, the rotor 29b of the differential receiving device rotates the cam 30 in a clockwise direction to release the pressure on the pressure responsive resistance 20. As the pressure is released, the resistance of the resistor 20 is increased and the excitation of drier motor 14 and the control motor 35 is decreased. This causes the current in the armature of the control motor 35 to increase, and the regulator 37 again functions in the manner described in the foregoing to increase the speed of the drier motor 14 until the rotor of the receiving device 29 becomes stationary at which time the speed of the drier motor 14 will be at the normal correct value.

The action of the regulator 37 in response to changes in the load current of the control motor 35 is so rapid that no loop is formed in the web when a heavy load is suddenly imposed upon the drier motor 14, and the recalibrating action of the master regulating equipment prevents the formation of a loop as a result of any accumulated inaccuracy of the regulator 37.

After the web has been rethreaded through the calender stack and the tension reestablished, the system functions in a reverse manner to restore the operating conditions that existed prior to the snapoff.

Although in accordance with the provisions of the patent statutes the principle of this invention is described and the best mode in which it is now contemplated applying that principle, it will be understood that the apparatus and connections shown and described are merely illustrative and that the invention is not limited thereto, since alterations and modifications will readily suggest themselves to persons skilled in the art without departing from the true spirit of this invention or from the scope of the annexed claims.

What I claim as new and desire to secure by Letters Patent of the United States is:

1. A control system comprising in combination, a main dynamo-electric machine electrically connected to a source of supply, an auxiliary dynamo-electric machine connected in series relationship with said main machine, speed regulating means responsive to a departure of the speed of said main machine from a predetermined value comprising a control dynamo-electric machine mechanically connected to said main machine, means responsive to a deviation of a terminal electrical characteristic of said control machine from a fixed value for controlling said auxiliary machine to decrease said departure, a master speed device and means responsive to a variation in the ratio of the speeds of said control machine and master device for recalibrating said speed regulating means thereby to restore said speed ratio to its orginal value and to complete the restoration of the speed of said main machine to said predetermined value.

2. A control system comprising in combination, a main dynamo-electric machine connected to a supply source, speed regulating means for said machine comprising an auxiliary dynamo-electric machine connected in series relationship with said main machine, a control dynamo-electric machine mechanically connected to said main machine, and means responsive to deviation of a terminal electrical characteristic of said control machine from a predetermined value for controlling said auxiliary machine to decrease a departure of the speed of said main machine from a predetermined value, a master speed device and means responsive to a variation in the ratio of the speeds of said control machine and master speed device for recalibrating said speed regulating means thereby to restore said speed ratio to its original value and to complete the restoration of the speed of said main machine to said predetermined value.

3. A control system comprising in combination, a main dynamo-electric machine connected to a source of supply, an auxiliary dynamo-electric machine connected in series relationship with said main machine, a control dynamo-electric machine mechanically coupled to said main machine, and means responsive to a variation in a terminal electrical characteristic of said control machine from a predetermined value for varying the voltage of said auxiliary machine thereby to decrease a departure of the speed of said main machine from a predetermined value, a master speed device, and means responsive to a variation in the ratio of the speeds of said control machine and master device for varying the calibration of said speed regulating means to effect restoration of said speed ratio to its original value and to complete the restoration of the speed of said main machine.

4. A control system comprising in combination, a main dynamo-electric machine connected to a supply source, speed regulating means for said machine comprising an auxiliary dynamo-electric machine connected in series relationship with said main machine, a control dynamo-electric machine mechanically connected to said main machine and means responsive to deviation in a terminal electrical characteristic of said control machine from a predetermined value for controlling the magnitude and polarity of the voltage of said auxiliary machine thereby to effect a decrease in a departure of the speed of said main machine from a predetermined value, a master speed device and means responsive to a variation in the ratio of the speeds of said control machine and master device for varying the calibration of said speed regulating means to restore said speed ratio to its original value thereby to complete the restoration of the speed of said main machine to said predetermined speed value.

5. A control system comprising in combination, a main dynamo-electric machine electrically connected to a source of supply, speed regulating means for said machine comprising an auxiliary dynamo-electric machine connected in series relationship between said main machine and said source, a control dynamo-electric machine mechanically connected to said main machine and means responsive to deviation of a terminal electrical characteristic of said control machine from a predetermined value for varying the excitation of said auxiliary machine to control its voltage thereby to effect a decrease in a departure of the speed of said machine from a predetermined value, a master speed device and means responsive to a variation in the ratio of the speeds of said control machine and master speed device for recalibrating said speed regulating means to restore said speed ratio to its original value and thereby to complete the restoration of the speed of said main machine to said predetermined value.

6. A control system comprising in combination, a main dynamo-electric machine electrically connected to a supply source, speed regulating means for said machine comprising an auxiliary dynamo-electric machine connected in series relationship with said main machine, a control dynamo-electric machine mechanically coupled to said main machine and a regulating device responsive to deviation of a terminal electrical characteristic of said control machine from a predetermined value for controlling the voltage of said auxiliary machine to decrease a departure of the speed of said main machine from a predetermined value, said regulating device being provided with a stabilizing winding electrically connected to the series circuit including said main and auxiliary machines.

7. A control system comprising in combination, a main dynamo-electric machine electrically connected to a supply source, speed regulating means for said machine comprising an auxiliary dynamo-electric machine connected in series relationship with said main machine, a control dynamo-electric machine mechanically coupled to said main machine and a regulating device responsive to deviation of a terminal electrical characteristic of said control machine from a predetermined value for controlling the voltage of said auxiliary machine to decrease a departure of the speed of said main machine from a predetermined value, a transformer having its primary winding connected in the series circuit including said main and auxiliary machines, said regulating device having a stabilizing winding connected to the secondary winding of said transformer.

8. A control system comprising in combination, a main dynamo-electric machine connected to a source of supply, speed regulating means for said main machine comprising an auxiliary dynamo-electric machine connected in series relationship with said main machine, a control dynamo-electric machine mechanically connected to said main machine and means responsive to deviation of a terminal electrical characteristic of said control machine from a predetermined value for controlling the magnitude and polarity of the voltage of said control machine to decrease a departure of the speed of said main machine from a predetermined value, a master speed device, a variable resistor in the field circuits of said main machine and control machine, and means responsive to a variation in the speeds of said master device and control machine for actuating said resistor to vary the excitation of said main machine and to recalibrate said speed regulating means to restore said speed ratio to its original value and to complete the restoration of the speed of said main machine to said predetermined value.

DAVID R. SHOULTS.